United States Patent
Shohdohji

(10) Patent No.: US 7,426,313 B2
(45) Date of Patent: Sep. 16, 2008

(54) METHOD AND APPARATUS FOR REDUCTION MOSQUITO NOISE IN DECODED IMAGES

(75) Inventor: Tsutomu Shohdohji, Miyashiro-Machi (JP)

(73) Assignee: School Foundation of Nippon Institute of Technology, Tokyo (JP)

(*) Notice: Subject to any disclaimer, the term of this patent is extended or adjusted under 35 U.S.C. 154(b) by 657 days.

(21) Appl. No.: 10/861,506

(22) Filed: Jun. 7, 2004

(65) Prior Publication Data

US 2005/0117807 A1   Jun. 2, 2005

(30) Foreign Application Priority Data

Dec. 1, 2003   (JP) .............................. 2003-402327

(51) Int. Cl.
*G06K 9/40* (2006.01)
*G06K 9/36* (2006.01)
*G06K 9/46* (2006.01)

(52) U.S. Cl. ....................................... 382/260; 382/233

(58) Field of Classification Search ................. 382/254, 382/260, 263, 264, 267, 275, 232, 233; 348/400–405, 348/409–412, 415, 420, 384, 390, 394
See application file for complete search history.

(56) References Cited

U.S. PATENT DOCUMENTS 5,850,259 A * 12/1998 Sugiyama .............. 375/240.04
7,046,862 B2 * 5/2006 Ishizaka et al. ............. 382/298
7,076,113 B2 * 7/2006 Le Dinh ..................... 382/261
2004/0126033 A1 * 7/2004 Ishizaka ..................... 382/254
2004/0257455 A1 * 12/2004 Aoyama ................... 348/222.1

OTHER PUBLICATIONS

Tsutomu Shohdohji et al., *An Efficient Approach to the Reduction of Mosquito Noise for the JPEG/JPEG2000 Decoded Image by Using Epsilon Filter*, IS & T's NIP18: International Conference on Digital Printing Technologies, Sep.29-Oct. 4, 2002, pp. 798-802, w/Partial English Translation.
Tsutomu Shohdohji et al., *Mosquito Noise Reduction Algorithm for Decoded Image*, IS & T's NIP19: International Conference on Digital Printing Technologies, Sep. 28-Oct. 3, 2003, pp. 876-879, w/Partial English Translation.

* cited by examiner

Primary Examiner—Yon J. Couso
(74) Attorney, Agent, or Firm—Westerman, Hattori, Daniels & Adrian, LLP.

(57) ABSTRACT

A method and an apparatus of reducing the mosquito noise in a decoded image by using a noise reduction algorism that does not depend on the compression coding algorism applied to the image to be improved. The decoded compression-coded digital image is divided into blocks. The standard deviation or the "variance coefficient" of luminance values is calculated for each block of the decoded compression-coded digital image. An $\epsilon$ matrix for the compression-coded digital image is composed so that all components of each block of the $\epsilon$ matrix is filled with the standard deviations or the variance coefficients for each block. An $\epsilon$ filter is composed so that its $\epsilon$ values are expressed by the $\epsilon$ matrix. The decoded compression-coded digital image is applied to the $\epsilon$ filter to reduce the mosquito noise that arises during decoding process.

4 Claims, 10 Drawing Sheets

(a)          (b)

| $x_{n-2,m-2}$ | $x_{n-2,m-1}$ | $x_{n-2,m}$ | $x_{n-2,m+1}$ | $x_{n-2,m+2}$ |
|---|---|---|---|---|
| $x_{n-1,m-2}$ | $x_{n-1,m-1}$ | $x_{n-1,m}$ | $x_{n-1,m+1}$ | $x_{n-1,m+2}$ |
| $x_{n,m-2}$ | $x_{n,m-1}$ | $x_{n,m}$ | $x_{n,m+1}$ | $x_{n,m+2}$ |
| $x_{n+1,m-2}$ | $x_{n+1,m-1}$ | $x_{n+1,m}$ | $x_{n+1,m+1}$ | $x_{n+1,m+2}$ |
| $x_{n+2,m-2}$ | $x_{n+2,m-1}$ | $x_{n+2,m}$ | $x_{n+2,m+1}$ | $x_{n+2,m+2}$ |

METHOD AND APPARATUS FOR REDUCTION MOSQUITO NOISE IN DECODED IMAGES

BACKGROUND OF THE INVENTION

The invention relates to an algorithm of reducing noises that arise during decoding process for a compression-coded digital image, especially to a method and an apparatus of reducing the mosquito noise using said algorithm, applied to the JPEG compression coding scheme.

DESCRIPTION OF THE PRIOR ART

The JPEG (Joint Photographic Experts Group: a cooperative working body between ISO and ITU-TS for image compression standardization) compression coding scheme is generally used for compression of a digital image. Although both reversible and irreversible coding methods are provided in the JPEG compression coding scheme, the JPEG baseline algorithm that is a kind of irreversible coding methods is generally used because of its high compression efficiency. A JPEG compressed image can be obtained by using DCT (Discrete Cosine Transform), a quantization table and the Haffman coding scheme. Although an irreversible coding method can realize a drastically high degree of compression of an image, it often induces degradation or noises in the image in return.

The JPEG2000 compression coding scheme was standardized in January 2001 as a new standard that was extended from the JPEG compression coding scheme. Presently, however, the JPEG compression coding scheme is used widely, since there are not so many software programs or software/hardware plug-ins available that use the JPEG2000 format, as compared to those which use the JPEG format.

In the JPEG2000 compression coding scheme, an image is divided into two portions horizontally and then divided into two portions vertically, resulting in four image elements each of which has the half horizontal size and the half vertical size of the original image. Each of these four elements is characterized as a combination of a low frequency component which is visually significant and a high frequency component which is visually less-significant, such as "the low frequency component and the low frequency component", "the low frequency component and the high frequency component", "the high frequency component and the low frequency component" and "the high frequency component and the high frequency component". A hierarchical set of elements is generated by recurrently applying the above-mentioned process to low frequency components which are visually important. During the process, data can be compressed by quantizing high frequency components coarsely as compared to low frequency components. Processing flows of JPEG2000 coding and decoding are shown in FIG. 4.

The block noise in JPEG2000 coding is less conspicuous as compared to the one in the JPEG coding where DCT is applied to each of 8×8 blocks, since DWT (Discrete Wavelet Transform) is applied for JPEG2000 coding. JPEG2000 coding also enables reduction of the mosquito noise. On the other hand, however, degradation of image quality increases as the degree of compression increases in JPEG2000 coding; Unsightly degradation often appears at an edge portion in the image, since the edge portion where the change in luminance is sharp tends to become dull after JPEG2000 coding and decoding are applied there. FIG. 5(b) shows the result after JPEG2000 coding and decoding are applied to the image of FIG. 5(a), as an example of typical degradation. FIGS. 6(a) and 6(b) show luminance value changes for pixels at each of the same horizontal positions in FIGS. 5(a) and 5(b). Degradation of image quality at the edge portion can be observed clearly from these figures that show luminance value changes.

Major noises arising from the JPEG compression coding scheme are the block noise and the mosquito noise, both of which are unsightly for human eyes (the false contour noise may arise in the JPEG2000 compression coding scheme, although the block noise does not exist in the JPEG2000 scheme because of its algorism characteristics). The inventor has already proposed an algorithm that can reduce the block noise and the false contour noise among major noises mentioned above. This invention relates to an algorithm of reducing especially the mosquito noise, among noises arising during such high-degree compression coding such as the JPEG and the JPEG2000 schemes.

It is known that the mosquito noise arises in an image having a sharp contour, an isolated point or a slant line. It is also known that application of an $\epsilon$-separation nonlinear digital filter (an $\epsilon$ filter, hereafter) is effective for reducing the mosquito noise while maintaining the contour. The inventor has already proposed a variable $\epsilon$ filter algorism where the value of $\epsilon$ is changed for each region of the image (this variable $\epsilon$ filter algorism will be called "the conventional algorism" hereafter). The $\epsilon$ filter can eliminate noises of which values are smaller than a prescribed $\epsilon$ value, while maintaining the sharp change in the image. The original image is kept unchanged when the $\epsilon$ value is set to 0. When the $\epsilon$ value becomes infinity, the $\epsilon$ filter works as a simple low-pass filter. Conceptual image of an $\epsilon$ filter is shown in FIG. 12.

The conventional algorism is explained in the following as Step 1 and as Step 2.

(a) Step 1: Detection of a contour in an image by using the variance of the luminance values Step 1.1: In order to detect a sharp contour in an image that induces degradation, calculate the variance of luminance values of N×N pixels around the pixel of interest and iterate this process for each pixel of the image, as shown by 10 in FIG. 8. Luminance values for the YCbCr color format are used as luminance values for the calculation, if the algorism is to be applied to a JPEG/JPEG2000 decoded color image. A luminance value is expressed by 256 steps (8 bits) for each of three primary colors. After calculating variance values for all pixels of the image, a matrix of valiance values for the image (the "variance matrix"), can be obtained as shown in FIG. 8.

Step 1.2: Considering that noises arise around a sharp contour, compare variance values obtained by Step 1 for each pixel within an M×M block of the image, and select the largest variance value in the region as the representative variance value for the pixel point at the center of the M×M block, as shown by 11 in FIG. 9. After calculating representative variance values for all pixels of the image, an appropriate adjusting coefficient is multiplied to each of the representative variance values in order to obtain a matrix of $\epsilon$ values for the image (the "$\epsilon$ matrix" or the "threshold matrix") as shown in FIG. 9.

(b) Step 2: Execution of noise reduction filtering (variable $\epsilon$ filtering) Execute $\epsilon$ filtering for each pixel in the image by using $\epsilon$ values obtained for each block by Step 1 as shown in FIG. 10.

Through the above process, the $\epsilon$ filter that was effective in the JPEG compression coding scheme for reducing noises generated around a contour in an image is basically applied also to this JPEG/JPEG2000 compression coding schemes, in order to reduce noises around a contour in an image while maintaining the contour as it is. In FIG. 7(a) small variations (that are recognized as the mosquito noise) can be seen at the edge portion of the luminance value change, but they are eliminated clearly after ε filtering is applied as shown in FIG. 7(b). Since the ε filter works to set the output signal level zero if the input signal level lies outside of predetermined threshold values, it is important to decide appropriate threshold levels. For example, if the threshold level is set larger than the difference of signal levels at points across the border of the contour in the original image, not only variations caused by degradation but also meaningful information in the original image will be filtered, causing degradation in image quality. In Step 1 and 2 aforementioned, such loss of meaningful information can be avoided by adjusting the ε value of the filter according to the contour information in the image.

(c) Characteristics of the ε Filter:

The transfer function of the ε filter is expressed by equations (1) and (2).

$$y_{n,m} = \frac{\sum_{i=-\frac{M-1}{2}}^{\frac{M-1}{2}} \sum_{j=-\frac{M-1}{2}}^{\frac{M-1}{2}} T[x_{n+i,m+j} - x_{n,m}] \cdot x_{n,m}}{\sum_{i=-\frac{M-1}{2}}^{\frac{M-1}{2}} \sum_{j=-\frac{M-1}{2}}^{\frac{M-1}{2}} T[x_{n+i,m+j} - x_{n,m}]}, \quad (1)$$

$$T[x] = \begin{cases} 1 & (-\varepsilon \leq x \leq \varepsilon) \\ 0 & (x < -\varepsilon, \varepsilon < x). \end{cases} \quad (2)$$

Since the output luminance value $y_{n,m}$ of this filter for the pixel of interest having an original (input) luminance value of $x_{n,m}$ is the average of luminance values in the region considered (the M×M region around the pixel of interest that has the luminance value of $x_{n,m}$) only for pixels in the region that have a luminance value within the luminance value of $x_{n,m}\pm\varepsilon$, the filter can remove small noises within $\pm\varepsilon$ while maintaining a big change that occurs across the contour.

The filter has characteristics such that it passes through all input signals as they are when ε is 0 and that it works as a low-pass filter when ε is infinity. The inventor studied possible noise value distribution for several typical contours in order to obtain an appropriate value for N that is necessary for determining the variance matrix of the image, and an appropriate value for M that is necessary for determining the ε matrix of the image. As the result of the study, the inventor found that almost all of the noise value distributions could be covered when N=7 and M=9. Here the value of ε is set to a fixed value, 0.01 times the maximum value of the 9×9 variance matrix. By these settings, almost all noises arising around typical contours can be filtered.

In the conventional algorithm explained above, variation degree of luminance values in a prescribed filtering window (or a "block") for an image is expressed by the variance of luminance values of all pixel points within the block, by using each luminance value for each pixel point within the block (here, luminance values for the YCbCr color format are used as luminance values for the calculation, if the algorithm is to be applied to a JPEG/JPEG2000 decoded color image). It is necessary in the conventional algorithm, however, to set an appropriate coefficient for correcting the variance value in order to obtain proper ε values, and strictly speaking, the optimum coefficient value will change if the image changes (in the above explanation, the coefficient is set to a constant value of 0.01). FIG. 11 shows an example of a block having the size of 5×5.

The purpose of the invention is to revise the conventional ε filter algorithm explained above so that the parameter of the noise reduction filter (ε value) can be automatically determined, in order to provide a method and an apparatus of reducing the mosquito noise in a decoded image by using the noise reduction algorithm that does not depend on the compression coding algorithm applied to the image.

SUMMARY OF THE INVENTION

The method or the apparatus of this invention for reducing the mosquito noise in a decoded image that arises during decoding process is characterized in that it uses an algorithm wherein: (1) a decoded compression-coded digital image is divided into blocks, (2) the standard deviation or the "variance coefficient" of luminance values is calculated for each block of said decoded compression-coded digital image (in order to numerically express the degree of variance of luminance values in a block, the standard deviation or the "variance coefficient" of luminance values of pixels in the block is used for the invention, where the "variance coefficient" is the standard deviation of luminance values of pixels in the block divided by the average value of luminance values of pixels in the block), (3) an ε matrix for said compression-coded digital image is composed so that all components of each block of said ε matrix is filled with said standard deviations or said variance coefficients for each block, (4) an ε filter is composed so that its ε values are expressed by said ε matrix and (5) said decoded compression-coded digital image is applied to said ε filter to reduce the mosquito noise that arises during decoding process. The invention is especially effective when said compression-coded digital image is an image compressed by the JPEG compression coding scheme.

The algorithm of the invention is practical and effective when it is applied to an image that needs picture quality improvement, since the algorithm does not require calculation of coefficients for correcting variance values that are necessary for the conventional algorithm, and consequently, the calculation is simpler and takes less time as compared to the conventional algorithm.

DESCRIPTION OF DRAWINS

FIG. 1 explains how an ε matrix is generated.

DESCRIPTION OF THE PREFERRED EMBODIMENT

The preferred embodiment of the invention is explained in detail in the following, referring to figures.

The algorism of this invention consists of two phases, "Phase I" for collecting image information and "Phase II" for applying ε filtering, as are explained in the following:

Phase I

Figure 1:
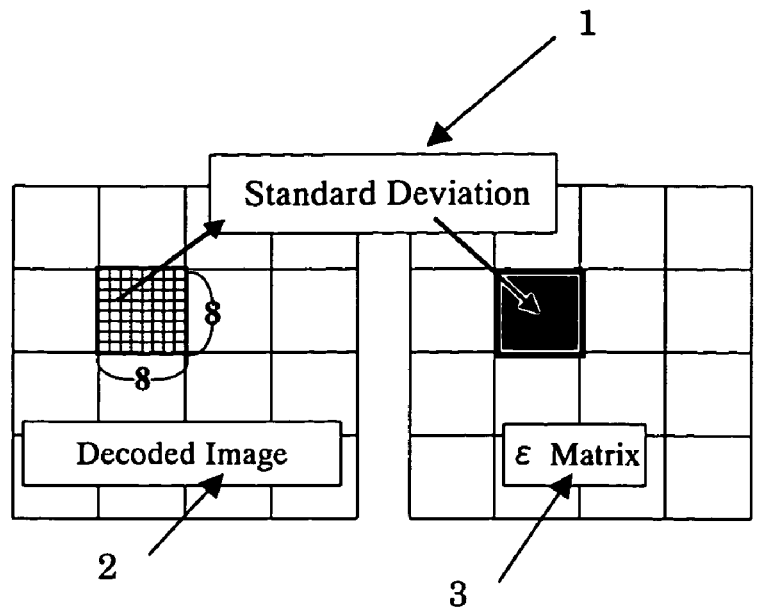
Figure 3:
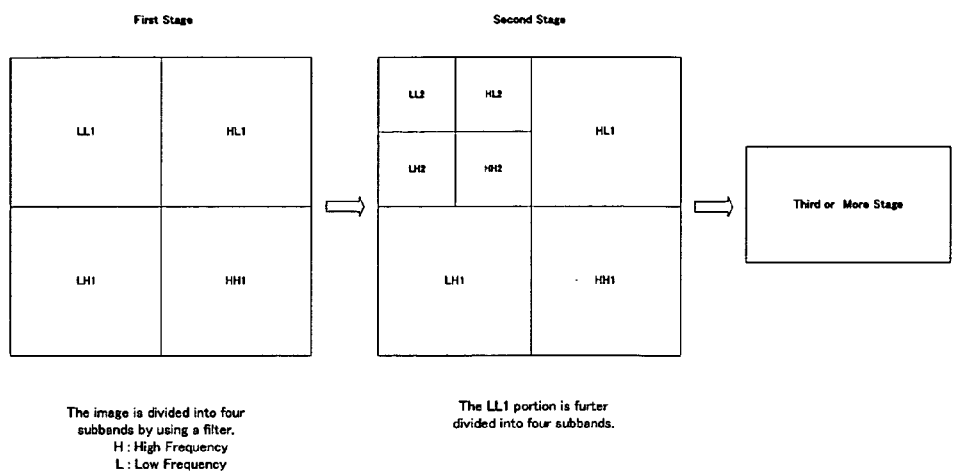
FIG. 3 is a figure to explain the process of the JPEG2000 compression coding.
Figure 4:
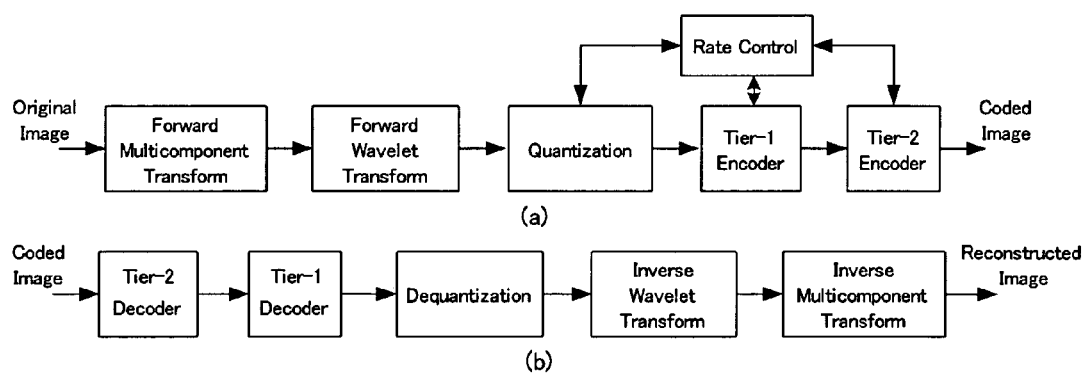
FIG. 4 is a block diagram to show flows of JPEG2000 coding and decoding.
Figure 5:
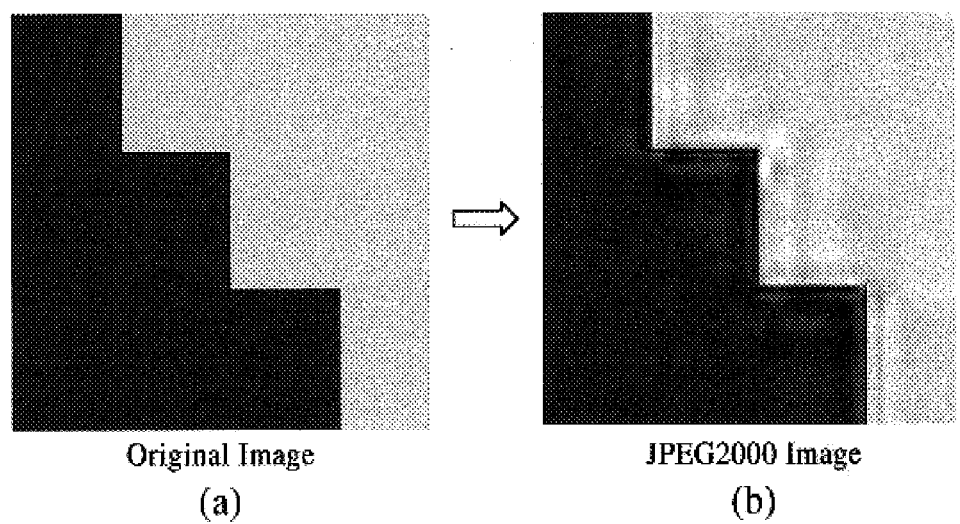
FIG. 5 shows an example of JPEG2000 coding and decoding.
Figure 6:
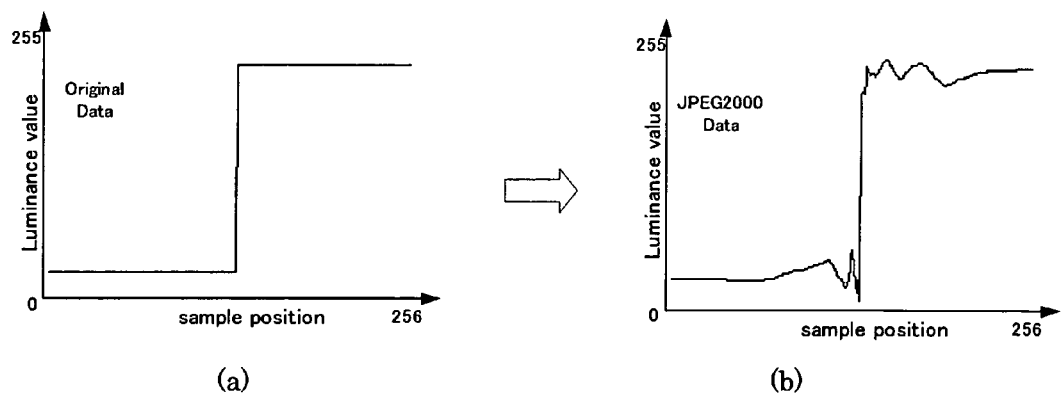
FIG. 6 shows luminance value changes at the edge portion of an original image (a) and at the edge portion of decoded image using the JPEG2000 coding scheme (b).
Figure 7:
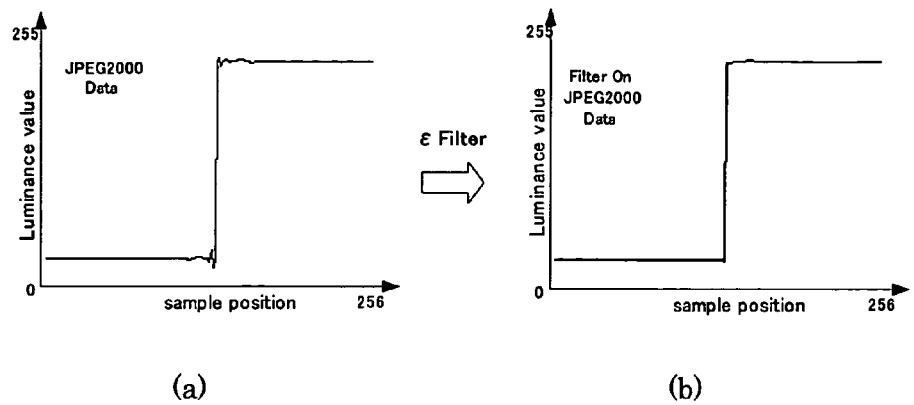
FIG. 7 shows characteristics of an ε filter.
Figure 8:
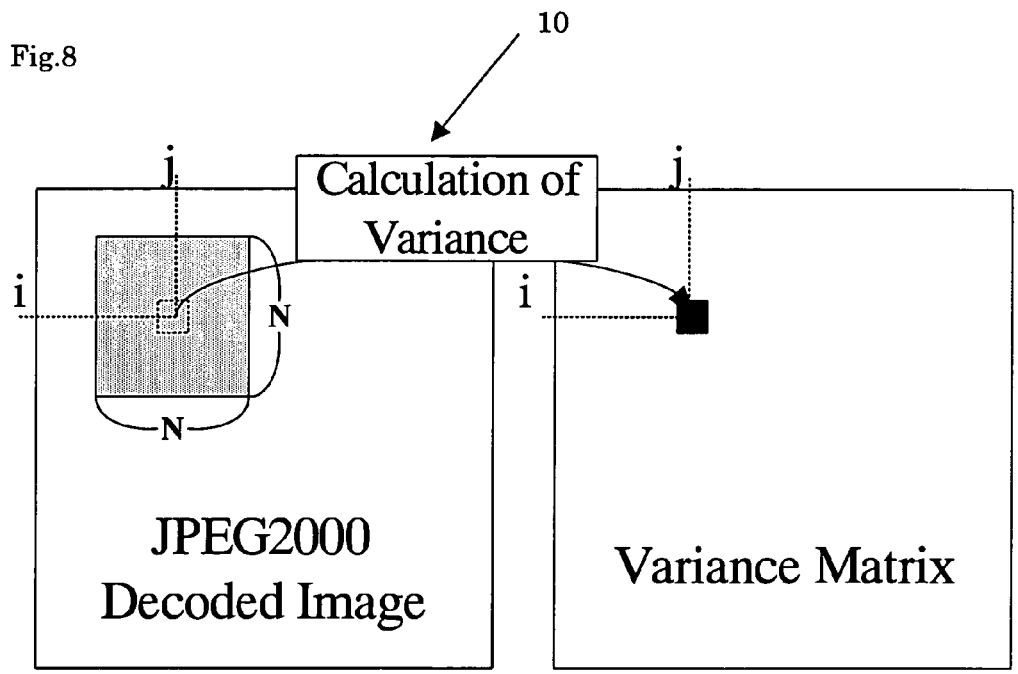
FIG. 8 is a figure to explain the variance value calculation method in the conventional algorithm.
Figure 9:
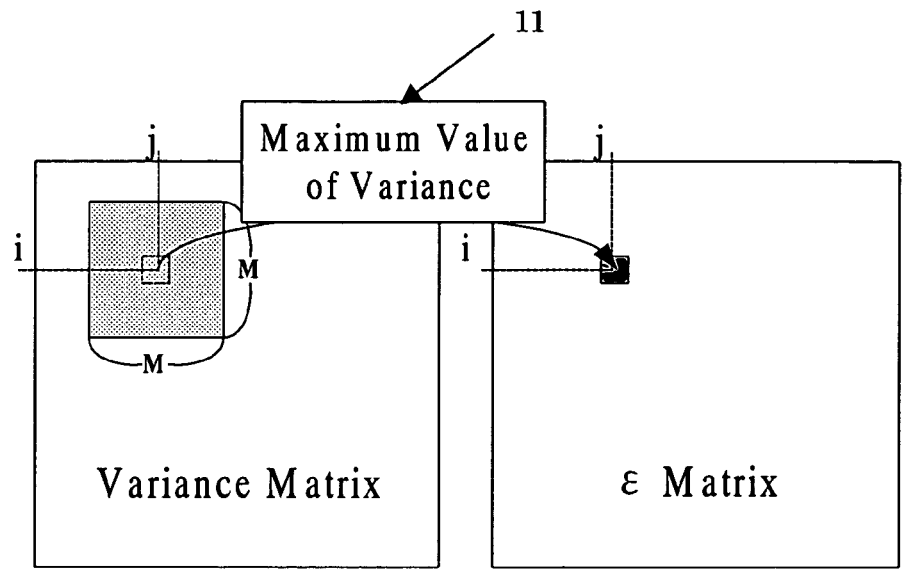
FIG. 9 is a figure to explain the representative variance value calculation method in FIG. 8.
Figure 10:
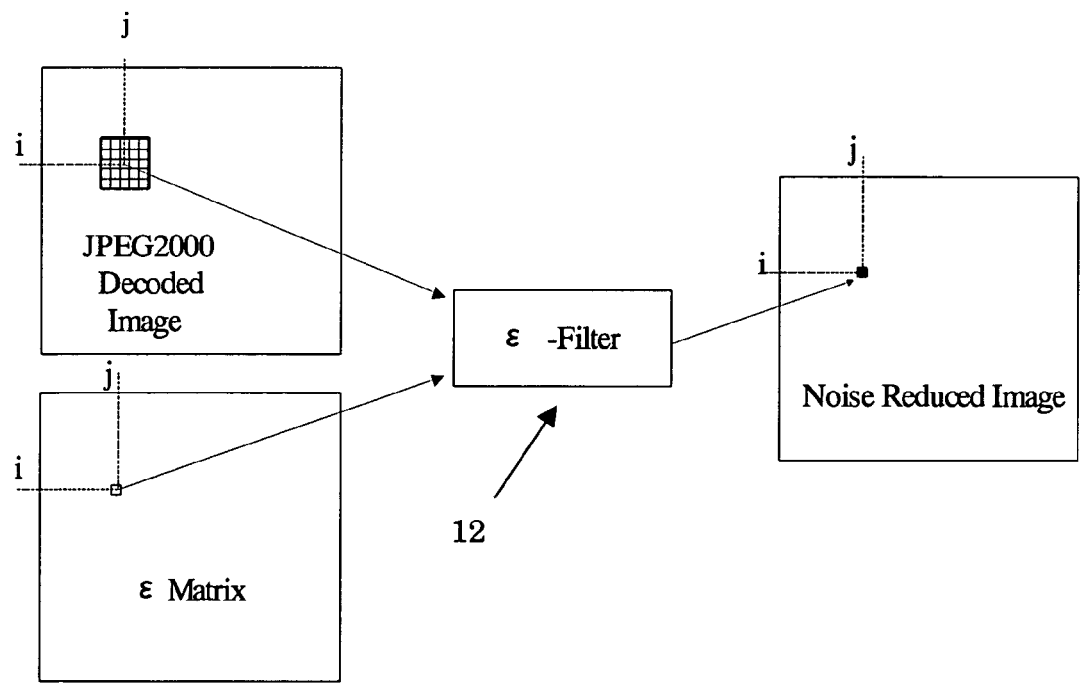
FIG. 10 is a figure to explain the process of conventional ε filtering.
Figures 11, 12:
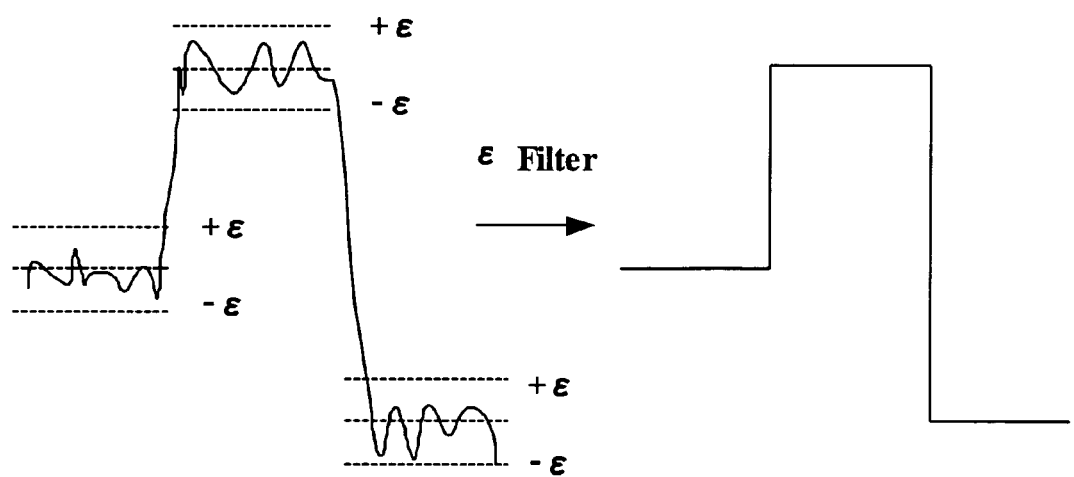
FIG. 11 shows a 5×5 filtering window.
FIG. 12 is a figure to explain the effect of ε filtering.

In order to find out the region in an original decoded image (2 in FIG. 1) where a sharp contour exists, the image is divided into blocks (an example of the block size is 8×8 pixel points is used for the embodiment explained in the following). The standard deviation or the "variance coefficient" of luminance values (1 in FIG. 1) is calculated for each block of the decoded image. Here, the "variance coefficient" is the standard deviation of luminance values of pixels in the block divided by the average value of luminance values of pixels in the block. By filling each block with the standard deviation or the variance coefficient calculated for each respective block, a matrix that has components of which values are the same within each block is composed, resulting in a mosaic pattern of component values by blocks. The composed matrix is called the "ε matrix" (3 in FIG. 3). Each standard deviation or variance coefficient obtained by this procedure becomes the ε value of the ε filter for each block.

Figure 2:
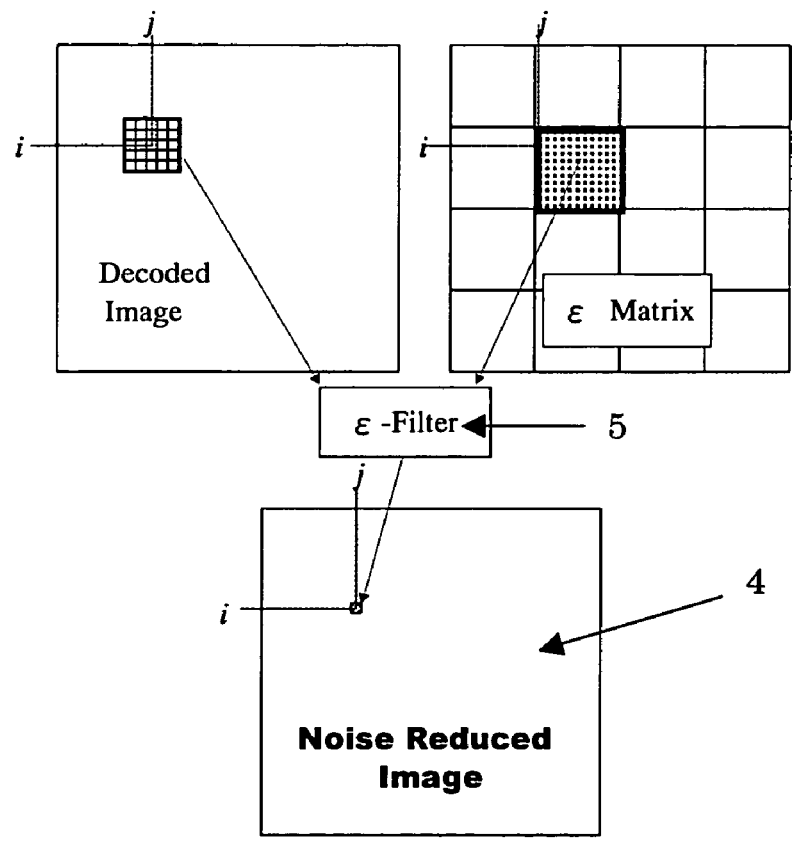
FIG. 2 is a figure to explain the process of ε filtering.

Phase II

ε filtering is then applied to each pixel in the original decoded image by using the ε matrix obtained in Phase I (5 in FIG. 2). As the result of the filtering, the average of luminance values of pixels within each block of an arbitrarily predetermined size is obtained for each pixel of interest in the original decoded image, as the output of ε filter (4 in FIG. 2) for each pixel of interest in the original decoded image. Here, "luminance values of pixels" can be obtained as pixel data of the original decoded image, and the luminance value average is taken only for pixels in the block satisfying the condition that luminance values of them are within the luminance value ±ε of the pixel of interest in the block. The averaged luminance value for each pixel is used as the noise-removed decoded luminance value for each pixel of the image. The same procedure of Phase I and Phase II is carried out for each color component when the image is a colored picture.

Figure 19:
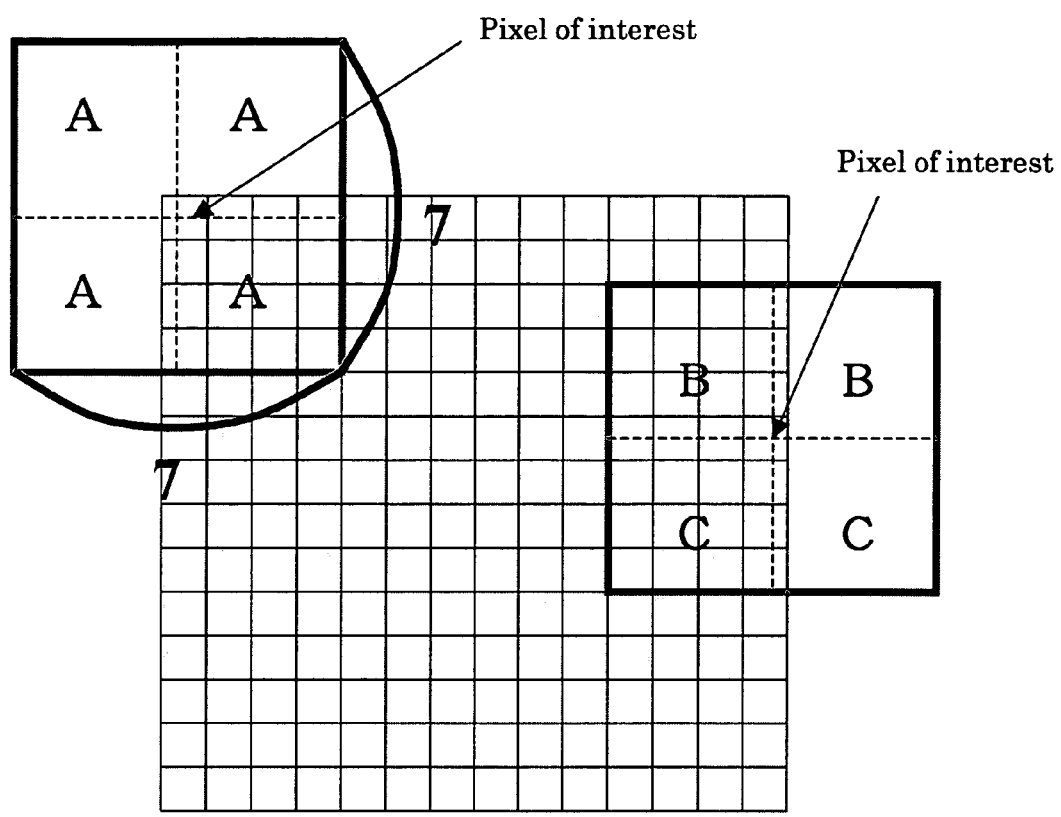
FIG. 19 is a figure to explain the process of mirroring that is applied to a block for pixels that exist at the bottom/top left or the top/bottom right corners, or to a block for pixels that exist on one of the four sides of the image.

Further detailed procedure of Phase II is described in the following:

The output value of the ε filter corresponding to each pixel in the compression decoded image is calculated by the filter by using information in the ε matrix obtained by Step I. Although the block size in the calculation can be arbitral, the size of 5×5, 7×7 or 9×9 is recommended for use. FIG. 2 shows a schematic explanation for the procedure. The averaged output luminance value of the filter $y_{i,j}$ corresponding to the input luminance value $x_{i,j}$ for the pixel of interest in the decoded image is calculated as follows: By using each ε value for corresponding $x_{i,j}$ (the value of the ε matrix component at the i-th row and the j-th column), values of $x_{i,j}\pm\epsilon$ can be determined for each $x_{i,j}$. Next, all luminance values within $x_{i,j}\pm\epsilon$ in the block that includes the pixel of interest are extracted and then the average of them is calculated as each output $y_{i,j}$ corresponding to each input $x_{i,j}$. FIG. 19 shows how this procedure is carried out with respect to the $x_{i,j}$ of pixel of interest, in case of the block size of 7×7. The calculation formula for the output $y_{i,j}$ in response to the input of interest $x_{i,j}$ is expressed by Equation (3) in the following.

$$y_{ij} = \frac{\sum_{k=-3}^{3}\sum_{l=-3}^{3} T[x_{ij} - x_{i-k,j-l}] \cdot x_{i-k,j-l}}{\sum_{k=-3}^{3}\sum_{l=-3}^{3} T[x_{ij} - x_{i-k,j-l}]} \qquad (3)$$

Here, $T[x]$ is=1 for $-\epsilon<x<\epsilon$, and 0 for any other x value.

Above procedure is iterated for all pixels in the image. Blocks for the pixel of interest at the bottom/top left or the bottom/top right corner of the image or on one of four sides of the image can have the same size as other blocks by using mirroring as shown in FIG. 19. Here, mirroring means filling the un-existing portion of a block by luminance values of pixels that are the same values as those of pixels in the existing portion of that block.

Experimental Results

Experimental results of using the algorism proposed by the invention are shown in FIGS. 13 to 16. The block size of the ε filter used in the experiments is 5×5.

Figure 13:
FIG. 13 shows an original JPEG2000 decoded image used as a reference for comparing the mosquito noise reduction algorithm of the invention with the conventional algorithm.
Figure 14:
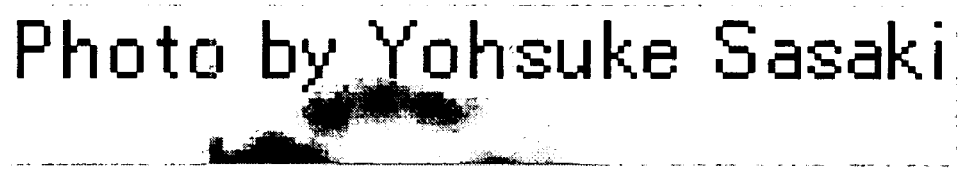
FIG. 14 shows the image after applying ε filtering to the image of FIG. 13.
Figure 15:
FIG. 15 shows the image after applying the conventional algorism to the image of FIG. 13.
Figure 16:
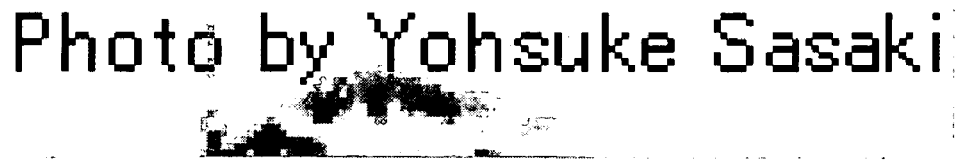
FIG. 16 shows the image after applying the algorism of the invention to the image of FIG. 13.

FIG. 13 shows an original JPEG2000 decoded image, FIG. 14 shows the image after applying ε filtering to the image of FIG. 13, FIG. 15 shows the image after applying the conventional algorism to the image of FIG. 13, and FIG. 16 shows the image after applying the algorism of the invention (the "new algorism", hereafter) to the image of FIG. 13.

Figure 17:
FIG. 17 shows the original decoded image of a JPEG2000 compression-coded image that includes the mosquito noise.
Figure 18:
FIG. 18 shows the image after applying the algorism of the invention to the image of FIG. 17.

FIG. 18 shows the result of applying the new algorism of noise reduction to another image example shown in FIG. 17 that is a decoded image using the JPEG2000 compression coding scheme. Intensive mosquito noises are observed in the image in FIG. 17.

All images obtained by using the new algorism acquired better subjective ratings of picture quality as compared to images obtained by using the conventional algorism. Although the average used for calculation of standard deviations or variance coefficients in Step I is the arithmetic average, there are several other average such as geometric average or the harmonic average. However, the arithmetic average produced the best results in the experiments. The variance coefficient is used in calculating the image of FIG. 16.

As already explained, after calculating each luminance value variance for each pixel of interest and then composing the ε matrix, properly-defined coefficients for correcting ε values are required in the conventional algorism. In the new algorism, however, not only the procedure of calculating ε matrix becomes simpler, but also automatic correction of ε values becomes possible by using only the luminance information of pixels of interest in the image. This makes the calculation method simpler, reduces the total calculation volume and enables efficient program coding. Reduction of the total calculation volume means that the effect of calculation cost reduction becomes more significant when the image size becomes larger.

In terms of picture quality improvement, the new algorism can reduce the mosquito noise better than the conventional algorism while maintaining the texture of the image, as shown clearly by the experimental results.

The method and the apparatus of the invention for reducing the mosquito noise in a decoded compression-coded image with the bit map format thus enable to reduce efficiently the mosquito noise in an image by applying the automatically-variable $\epsilon$ filter, regardless the type of compression coding schemes used.

The method and the apparatus of the invention are especially effective in improving quality of compression coded images transmitted through a transmission medium that has a limited bandwidth. Actual applications such as moving image exchange between mobile telephone subscribers, video distribution to end users and application to built-in type video capture cards for personal users can be expected, since the algorism requires less calculation volume and is capable of frame-by-frame calculation for moving images coded by video coding schemes such as Motion-JPEG and Motion JPEG2000 coding schemes.

What are claimed are:

1. A method for reducing the mosquito noise in a decoded image that arises during decoding process by using a mosquito noise reducing algorism wherein: (1) the decoded compression-coded digital image is divided into blocks, (2) the standard deviation or the variance coefficient of luminance values is calculated for each block of said decoded compression-coded digital image, (3) an $\epsilon$ matrix for said compression-coded digital image is composed so that all components of each block of said $\epsilon$ matrix is filled with said standard deviations or said variance coefficients for each block, (4) an $\epsilon$ filter is composed so that its $\epsilon$ values are expressed by said $\epsilon$ matrix and (5) said decoded compression-coded digital image is applied to said $\epsilon$ filter to reduce the mosquito noise that arises during decoding process.

2. A method for reducing the mosquito noise in a decoded image that arises during decoding process claimed in claim 1 wherein said compression-coded digital image is a compressed image obtained by the JPEG or JPEG2000 compression coding scheme.

3. An apparatus for reducing the mosquito noise in a decoded image that arises during decoding process by using a mosquito noise reducing algorism wherein: (1) the decoded compression-coded digital image is divided into blocks, (2) the standard deviation or the variance coefficient of luminance values is calculated for each block of said decoded compression-coded digital image, (3) an $\epsilon$ matrix for said compression-coded digital image is composed so that all components of each block of said $\epsilon$ matrix is filled with said standard deviations or said variance coefficients for each block, (4) an $\epsilon$ filter is composed so that its $\epsilon$ values are expressed by said $\epsilon$ matrix and (5) said decoded compression-coded digital image is applied to said $\epsilon$ filter to reduce the mosquito noise that arises during decoding process.

4. An apparatus for reducing the mosquito noise in a decoded image that arises during decoding process claimed in claim 3 wherein said compression-coded digital image is a compressed image obtained by the JPEG or JPEG2000 compression coding scheme.

* * * * *